United States Patent [19]

Reischl

[11] 4,251,401
[45] Feb. 17, 1981

[54] SUSPENSIONS OF ISOCYANATE DISTILLATION RESIDUES IN POLYOLS

[75] Inventor: Artur Reischl, Leverkusen, Fed. Rep. of Germany

[73] Assignee: Bayer Aktiengesellschaft, Leverkusen, Fed. Rep. of Germany

[21] Appl. No.: 88,809

[22] Filed: Oct. 29, 1979

[30] Foreign Application Priority Data

Oct. 27, 1978 [DE] Fed. Rep. of Germany ....... 2846814

[51] Int. Cl.$^3$ .............................................. C08L 75/00
[52] U.S. Cl. ................... 260/9; 260/30.8 R;
260/31.2 N; 260/32.6 N; 260/33.2 R; 525/424;
525/433; 525/439; 525/452; 525/461
[58] Field of Search ..................... 260/31.2 N, 30.8 R,
260/9, 33.2 R, 32.6 N; 525/424, 439, 433, 440,
452, 461

[56] References Cited

U.S. PATENT DOCUMENTS

| | | | |
|---|---|---|---|
| 3,360,495 | 12/1967 | Muller et al. | 260/33.2 R |
| 3,455,836 | 7/1969 | Shultz et al. | 521/160 |
| 3,634,361 | 1/1972 | Shultz et al. | 252/182 R |
| 3,636,030 | 1/1972 | Perkins | 260/453 SP |
| 3,897,314 | 7/1975 | Liebsch et al. | 260/453 PH |
| 3,963,679 | 6/1976 | Ullrich et al. | 528/45 |
| 3,993,641 | 11/1976 | Tiemann et al. | 260/239 AR |
| 4,000,099 | 12/1976 | Nemoto et al. | 260/18 TN |
| 4,065,362 | 12/1977 | Kataoka | 203/38 |
| 4,071,505 | 1/1978 | Meckel et al. | 528/49 |
| 4,076,577 | 2/1978 | Hetzel et al. | 260/453 SP |
| 4,143,008 | 3/1979 | Zwolinski et al. | 260/453 SP |

FOREIGN PATENT DOCUMENTS 2333150 1/1974 Fed. Rep. of Germany .
1346402 2/1974 United Kingdom .

*Primary Examiner*—Maurice J. Welsh
*Attorney, Agent, or Firm*—Gene Harsh; Joseph C. Gil

[57] ABSTRACT

This invention relates to stable suspensions of substantially monomer-free, insoluble, powdered tolylene diisocyanate distillation residues in polyhydroxyl compounds, to a process for producing these suspensions and to the use of the suspensions thus produced as the polyol component in the production of optionally foamed polyurethane plastics.

9 Claims, No Drawings

SUSPENSIONS OF ISOCYANATE DISTILLATION RESIDUES IN POLYOLS

BACKGROUND OF THE INVENTION

Considerable quantities of relatively high molecular weight, crosslinked, secondary products are formed in the production of isocyanates on an industrial scale. These secondary products are obtained as non-distillable residues during the working up by distillation of the crude isocyanate solutions obtained in the phosgenation of amines. These residues are generally unsuitable for the conventional application of isocyanates (production of polyurethane plastics). In order to avoid a total loss of the non-distillable residue, it is possible in some cases (for example, in the phosgenation of diamines of the diphenylmethane series) to isolate only part of the pure monomeric isocyanate from the crude phosgenation product, i.e. to leave a considerable proportion of monomeric isocyanate in the sump phase, in order to obtain the relatively high molecular weight secondary products in solution. For the liquid polyisocyanate mixture enriched with relatively high molecular weight products obtained in this way (so-called "crude MDI"), it has been possible in recent years to find a number of potential applications in special plastics.

All attempts, however, to use tolylene diisocyanate enriched with relatively high molecular weight secondary products ("crude TDI") and having a low but still economically acceptable content of monomeric tolylene diisocyanate have so far failed. During distillation of the phosgenation product of tolylene diamines, relatively high molecular weight insoluble products containing uretdione, isocyanurate, carbodiimide, uretone imine, urea and biuret groups are formed under the conditions used in practice. Depending on the o-tolylene diamine content of the starting product, methyl benzimidazolones can also be formed during phosgenation and, with time, are biuretized with the free isocyanate groups present, accompanied by formation of insoluble, crosslinked products. Although crude TDI distillation residues which still have a high monomer content (above 80% by weight) and contain virtually no methyl benzimidazolone or its derivatives, are soluble, they are not sufficiently stable in storage. The content of free NCO-groups decreases during storage, even at room temperature, accompanied by an increase in viscosity.

Numerous processes have also been proposed (U.S. Pat. No. 3,634,361, German Offenlegungsschrift No. 2,123,183, German Offenlegungsschrift No. 2,333,150, U.S. Pat. No. 3,455,836 and German Offenlegungsschrift No. 2,423,594) for dissolving TDI distillation residues, which still have a considerable content of free NCO-groups (preferably above 20% by weight), in an organic solvent in the presence of monomeric diisocyanates, optionally at high temperatures, and for using these residue solutions in the conventional way for the polyisocyanate polyaddition process. In practice, however, this method of utilizing the TDI residues fails because of the inadequate stability during storage and the inability to standardize (if, in fact, solutions were possible at all) or because of the sedimentation of insoluble constituents.

In recent years, TDI distillation residues have been partly utilized by means of alkaline hydrolysis. Unfortunately, only relatively small proportions of tolylene diamine can be recovered.

More success in maximizing the TDI yield achieved by using the so-called long-tube vertical evaporators (U.S. Pat. No. 3,897,314) which have been adopted for use on a wide scale in the commercial production of tolylene diisocyanate, and by continuous thermolysis of the liquid TDI residue tar. In the above process, the residues are substantially free from monomers, but still contain free isocyanate groups. This residue has to be stirred into water (quenching) in the form of hot (approximately) 150° to 300° C.) tar-like mass immediately after separation of the pure monomeric TDI in order to avoid smoldering fires and for physiological reasons. During this quenching process, the free isocyanate groups still present react with the water to form additional polyurea groups (hereinafter called denaturing). This reaction is being accompanied by the evolution of carbon dioxide. Only a very small percentage, around 1% to 10% by weight, of included isocyanate groups are left unreacted. Storage in water or in moist form causes the isocyanate content to undergo a further gradual reduction over a prolonged period.

These slag-like TDI residues contain inter alia polyurea, isocyanurate and polycarbodiimide groups and are substantially insoluble in all the conventional solvents. It is only at temperatures above about 250°±30° C. that they begin to melt to some extent, decomposing and giving off gasses.

The vast majority of TDI distillation residues are either dumped or burned in furnaces with considerable difficulty. These TDI residue slags amount to approximately 10% of the total TDI production. In cases where TDI residue slags are burned, deposits of firmly adhering, substantially non-flammable tarry masses accumulate on the bottom of the combustion chamber and, in many cases, decompose explosively at temperatures above about 500° C.

DESCRIPTION OF THE INVENTION

The object of the present invention is, therefore, to provide commercially feasible possibilites for recycling TDI distillation residues, particularly the TDI distillation residue slags and more particularly the TDI-residue slags quenched and denatured with water. The largest quantities accumulate in the production of 2,4-/2,6-tolylene diisocyanate in an isomer ratio of 80:20 and which do not melt, even at decomposition temperatures above 280° C. It has now, surprisingly, been found that TDI distillation residues can be converted into high-quality reactive fillers by very fine grinding, optionally followed by simple chemical modification reactions in heterodisperse phase. These reactive fillers are used in the form of non-sedimenting suspensions in polyhydroxyl compounds as the polyol component in the polyisocyanate-polyaddition process for the production of polyurethane plastics.

The present invention relates to dispersions of:

(A) from 2 to 60% by weight, preferably from 5 to 50% by weight and, with particular preference, from 10 to 40% by weight, based on the total weight of the dispersion, of a substantially monomer-free, crosslinked, distillation residue which is insoluble in inert organic solvents and which cannot be melted without decomposing, of the type accumulating in the form of slag in the removal of monomeric tolylene diisocyanate by distillation which is ground to an average particle size of less than 350 m$\mu$, preferably less than 25 m$\mu$, most preferably less than 15 m$\mu$ and, with particular preference, less than 5 m$\mu$, as the disperse phase, in (B) compounds containing at least 2, preferably from 2 to 6 and, with particular preference from 2 to 4 aliphatic hydroxyl groups and having an average molecular weight of from 400 to 10,000, preferably from 600 to 3,000, as the coherent phase. The instant invention can also utilize TDI residues which have been water quenched and denatured. This invention also comprises using TDI residues in which the free isocyanate groups have been completely or partly reacted with compounds containing acid hydrogen atoms.

As explained above, the residue slags dispersed in very finely divided, stable form in relatively high molecular weight polyhydric alcohols accumulate in conventional industrial processes for the production of 2,4- and/or 2,6-tolylene diisocyanate after the almost complete isolation of the monomeric diisocyanate in a quantity of more than 10% by weight, based on the theoretical yield of monomeric diisocyanate. After cooling the hot, tar-like residue (generally by introduction into water), a substantially monomer-free coarsely divided, irregularly shaped, insoluble, slag is obtained. This slag contains less than 15% by weight, and, in general, even less than 10% by weight of free isocyanate groups. The TDI residue slags also contain urea, biuret, uretdione, isocyanurate, carbodiimide, uretone imine groups and, in some cases, even methyl benzimidazolone groups and their biuretization products in varying quantitative ratios. So far as their molecular structure is concerned, these slags are so highly crosslinked through these functional groups that, even after size-reduction to a mean particle size of less than 5 m$\mu$, they are substantially insoluble in inert organic solvents. Methylene chloride, cyclohexane, toluene, xylene and dichlorobenzene are examples of these inert solvents. Boiling these slags in the above solvents has no dissolution effect either. Even in boiling dimethyl formamide, the slag particles are only partly swollen, but not dissolved. Only a very small proportion, if any, of the TDI distillation residues soften at temperatures above about 250° C. Above about 280° C., the distillation residues decompose without melting, giving off gasses in the process.

Before the suspensions in polyhydroxyl compounds are produced, the coarse-grained TDI residue slags have to be size-reduced. They are advantageously pre-comminuted to a particle size of less than about 3 mm in a comminuting machine. If it is desired to obtain the free NCO-groups, the slag is dried (preferably at a temperature below 50° C.), for example in a recirculaing air cabinet, until the water content has fallen below 5% by weight and, with particular preference, below 2% by weight. The slag is then further size-reduced in conventional grinding machines. It is particularly favorable from the economic point of view to subject the granulated, substantially dry TDI residue slag to mechanical disintegration in bulk in air-jet mills. Using mills of this type, mean particle sizes of less than 10 m$\mu$ may readily be obtained in a single pass with high throughputs. It is also possible to use steam-jet or air stream mills, such as cross-beater mills, ring gear mills or tubine mills. These may be arranged one behind the other in several stages, for fine size reduction and for use of pinned-disc mills or ball mills known per se, although in their case grinding takes longer. Surprisingly size reduction of the TDI residue slag may also be carried out in conventional mixing devices equipped with ploughshare-like mixing elements and (preferably multistage) cutter heads. Apparatus of this kind are commercially available on both a laboratory and a technical scale. These mixers act both as a mill and a reactor for the modification reactions mentioned above. The slag may be finely ground in the presence of the OH-functional suspending agent or an inert organic medium using a wet grinding process.

Toothed colloid mills, trigonal gear ring mills, corundum disc mills and stirrer-equipped ball mills, optionally arranged one behind the other, are particularly suitable for this purpose.

The advantage of dry grinding, however, lies in the fact that a standard power is obtained which may then be added to the various polyols used as suspending agents.

By grinding the TDI residue slag, the included functional groups mentioned above are made available for chemical reactions. The powdered residue may be subjected to a variety of different chemical modification reactions before, during or after dispersion in the relatively high molecular weight polyhydroxyl compounds. The modification reactions preceding suspension may be carried out both from the gas phase and also in an inert liquid medium. The small quantities of free isocyanate groups still present are particularly reacted with H-acid compounds. For example, the powdered TDI residue may be treated with ammonia or gaseous amines in a cylindrical reaction vessel. Preferably this is done using the countercurrent principle. The free NCO-groups are reacted after a very short time (less than 1 minute, depending on the fineness of the powder) without any need for mechanical mixing. Suitable amine components are any of the readily volatile primary and secondary monoamines and polyamines. Examples are methylamine, butylamine, diethylamine, dibutylamine, ethylene diamine, propylene diamine, ethanolamine, diethanolamine, propanolamine, etc. This modification reaction results in the formation of additional urea groups in the TDI residue powder. These can enter into condensation reactions with carbonyl compounds, such as formaldehyde, acetaldehyde, butyraldehyde, crotonaldehyde and acrolein, particularly formaldehyde. After modification with ammonia or amines, these carbonyl compounds may optionally be passed through the powder in gaseous form.

Instead of using formaldehyde and ammonia, it is, of course, also possible to use urotropin under hydrolyzing conditions to form methylene-urea bridges.

Another possible modification reaction is reaction with steam. The reaction of the free isocyanate groups of the residue powder with steam takes place very slowly at temperatures below 100° C., even in cases where very finely ground TDI residue slag is used. Quantitative polyurea formation may be obtained over a short period by applying reaction temperatures distinctly above the boiling point of water and preferably above 130° C. Providing the TDI residue slag is adequately size-reduced, it is sufficient to wet it with water and then to expose it for a few minutes to the temperatures mentioned above. Thereafter, the residue powder contains virtually no more free NCO-groups.

It is also possible to react the NCO-groups of the residue powder from the gas phase with alcohols such as methanol, ethanol, propanol or ethylene glycol, or with acids such as acetic acid.

The TDI residue powder may even be subjected to chemical modification reactions in suspension in water or an organic solvent. Of particular interest in this connection are catalyzed reactions of the free isocyanate groups themselves. Examples are the formation of uretdione groups by the action of trisubstituted phosphines or the formation of further carbodiimide groups by the action of phosphine oxide. All the above-mentioned modification reactions with ammonia, amines, aldehydes and ketones, alcohols and mono- and polycarboxylic acids may also be carried out on the residue powders suspended in water, in the polyol or in an organic solvent. It is also possible to add weakly acid compounds (for example, by sulphite or other isocyanate donors) in known manner with the free isocyanate groups. These may subsequently be split off at a later stage at elevated temperatures with liberation of the isocyanate groups. It is also possible to carry out modification reactions on the carbodiimide groups of the TDI residue powder using amines, phosphites or carboxylic acids in the same way as described in German Offenlegungsschriften Nos. 2,714,289; 2,714,292 and 2,714,293. The powdered TDI residue slags suspended in water or polyol or in the organic solvents may also be treated with any of the chain extenders (e.g. ethylene glycol, diethylene glycol, propylene glycol or dipropylene glycol) or chain terminators mentioned below in connection with the production of polyurethane plastics for removing the free isocyanate groups.

Suitable organic compounds for chemical modification of the finely divided TDI residue powders are any of the conventional organic solvents which have a boiling point of below 150° C. and, with particular preference, below 130° C., but which are essentially non-solvents for the TDI residue slag powders. These TDI residue powders can be suspended in the solvents up to a loading of approximately 60% solids by weight. Examples of such solvents are methylene chloride, acetone, petroleum ether, cyclohexane, ethylacetate, benzene, toluene and xylene. After the modification reaction, the inert suspending agent may be removed by filtration and drying or by distillation. In many cases, it is sufficient to use only that quantity of solvent which is required for dissolving the intended reactant or the catalyst or for uniformly distributing it in the TDI residue slag powder. This amount can be as little as 10% by weight or less. If it appears necessary to carry out modification of the residue slag powder at temperatures lying above the boiling point of the solvent used, the modification reaction can be carried out in a pressure vessel.

All these modification reactions may also be carried out simultaneously with the grinding of the residue slag (particularly in cases where wet-grinding processes are used).

In special cases, when the reaction mixture passes a pasty transition state, the above-mentioned modifying reactions may be carried out in self-cleaning screw machines. Suitable extruders are described, e.g. in "Schneckenmaschinen in der Verfahrenstechnik" by H. Hermann, Springer Verlag, Berlin/Heidelberg/New York. 1972, and in U.S. Pat. Nos. 3,963,679 and 3,993,641, incorporated herein by reference.

It is known in the art that chemical reactions may be carried out in extruders. Generally, however, thermoplastic polymers are produced or worked up in such screw machines, temperatures above the softening point of the material being applied. Surprisingly even the modification reactions according to the invention wherein non-meltable cross-linked TDI residue slags after denaturing with water are used may be carried out in the above mentioned extruders, free-flowing, very finely divided powders being directly obtained at the head of the extruder.

The suspensions according to the present invention are obtained by stirring the residue slag powders modified into the polyhydroxyl compound using known mixing techniques. It is possible, although less preferred, to stir the residue slag powder into the polyhydroxyl compound together with the solvent used for the modification reaction (water or organic solvent). In which case, the volatile suspending agent must be removed by distillation.

It is preferred to suspend the unmodified, finely ground TDI residue powder in the relatively high molecular weight polyhydroxyl compound and then to subject it to the modification reactions described above in situ. The free isocyanate groups of the residue slag powder may particularly advantageously be reacted with the hydroxyl groups of the relatively high molecular weight polyhydroxyl compound at elevated temperature. It may be regarded as extremely surprising that the NCO-groups of the finely divided TDI residue slag can be completely reacted in this way without suspensions having excessively high viscosities being formed, as might have been expected from the technical teaching of German Offenlegungsschriften Nos. 2,550,796 and 2,550,797. For example, the reaction of a TDI residue slag powder having an average particle size of 5 m$\mu$ and an NCO-content of approximately 10% by weight with enough of a trifunctional polyether of ethylene oxide and propylene oxide that equivalent quantities of free NCO and OH-groups are present in a simple stirrer-equipped vessel (at a temperature of 130° C.) gives a storable 40% dispersion of relatively low viscosity. This dispersion neither sediments nor changes viscosity over a period of 6 months. If, in contrast, monomeric tolylene diisocyanate is used in a quantity equivalent to the OH-groups of the polyether instead of the TDI residue slag powder under the same conditions, a tacky elastic reaction product which cannot be stirred is formed after a short time. It is believed that, in the case of the TDI residue slag powder, a considerable number of the free NCO-groups (on the order of 80%) unexpectedly did not react with the hydroxyl groups.

It is preferred to convert at least some of the free isocyanate groups of the powdered TDI residue slag by reaction with the hydroxyl groups of the relatively high molecular weight polyhydroxyl compound, effectively stabilizing the suspensions against sedimentation. It is surprising that, in these suspensions, fractions of the TDI residue slag powder having larger particle diameters also remain effectively dispersed. This is true even in cases where the polyhydroxyl compound is of low viscosity. A similar stabilizing effect is obtained in reactions of the TDI residue slag powder with ammonia, aminofunctional compounds, alcohols, carbonyl compounds etc. carried out in situ in a relatively high molecular weight polyhydroxyl compound. Cationic and/or anionic groups or groups capable of salt formation may be incorporated into the dispersed TDI residue slag powder in this way. Suitable reactants for such modification reactions are described in German Offenlegungsschriften Nos. 2,324,134; 2,423,984; 2,512,385; 2,513,815; 2,550,796; 2,550,797; 2,550,933; 2,550,862; 2,633,293 and 2,639,254. The processes described in these Offenlengungsschriften are advantageously used for the in situ modification of the powdered TDI residue slag with ammonia, amino-functional compounds, alcohols, aminoplast formers and/or aldehydes. It may be regarded as surprising that, in contrast to the teaching according to German Offenlegungsschrift No. 2,550,796, products of relatively low viscosity are obtained in cases where the suspensions are produced in situ in batches in stirrer-equipped vessels. This is true even in the absence of water.

In special cases, the suspensions according to the present invention may also be modified by radical polymerization reactions. Suspensions of powdered TDI residue slags, in which the relatively high molecular weight polyhydroxyl compound and/or the suspended TDI residue slag powders contain copolymerizable groups, are particularly suitable for this purpose. Suitable relatively high molecular weight polyhydroxyl compounds containing copolymerizable groups are, for example, unsaturated polyesters based on maleic acid. Unsaturated copolymerizable groups may be readily introduced into the TDI residue slag powders by the modification reactions described above. For example, the free NCO-groups of the residue may be reacted with an unsaturated alcohol (for example, allyl alcohol or acrylic acid esters containing hydroxyl groups) or with an unsaturated carboxylic acid (for example, acrylic acid, methacrylic acid, maleic acid or fumaric acid). Alternatively, the urea groups of the TDI residue slag powders may be reacted with unsaturated carbonyl compounds (for example, acrolein or crotonaldehye). Suspensions of this type may be modified by radical copolymerization with olefinically unsaturated monomers such as acrylonitrile, styrene, butadiene, neoprene, chloroprene, acrylic acid esters, methacrylic acid esters, vinyl chloride or vinylacetate using radical initiators known per se.

All of the above-mentioned modification reactions on the dispersions of TDI residue slag powders in relatively high molecular weight polyhydroxyl compounds may be carried out individually or together, successively or simultaneously. In general, modification is confined to the polyaddition and polycondensation reactions which are particularly easy to carry out. These reactions may take place in any order. It is preferred to carry out all these modification reactions in situ in the relatively high molecular weight polyhydroxyl compound. It is also possible to suspend TDI residue slag powders which have already been subjected to these modification reactions in the relatively high molecular weight polyhydroxyl compounds.

Suitable dispersants for the optionally modified TDI residue powders (component B of the suspensions according to the present invention) are polyhydroxyl compounds having a molecular weight in the range of from 400 to 10,000, preferably in the range of from 600 to 3,000. Examples are polyesters, polyethers, polythioethers, polyacetals, polycarbonates and polyester amides containing at least 2, generally from 2 to 6, but preferably from 2 to 4 hydroxyl groups, of the type known per se for the production of homogeneous and cellular polyurethanes:

(a) Suitable polyesters containing hydroxyl groups are, for example, reaction products of polyhydric, preferably dihydric and trihydric alcohols with polybasic, preferably dibasic, carboxylic acids. It is also possible to use the corresponding polycarboxylic acid anhydrides or corresponding polycarboxylic acid esters of lower alcohols or mixtures thereof in place of the free polycarboxylic acids for producing the polyesters. The polycarboxylic acids may be aliphatic, cycloaliphatic, aromatic and/or heterocyclic. They may be substituted, for example by halogen atoms and/or unsaturated.

Examples of such carboxylic acids and their derivatives are succinic acid, adipic acid, suberic acid, azelaic acid, sebacic acid, phthalic acid, isophthalic acid, trimellitic acid, phthalic acid anhydride, tetrahydrophthalic acid anhydride, hexahydrophthalic acid anhydride, tetrachlorophthalic acid anhydride, endomethylene tetrahydrophthalic acid anhydride, glutaric acid anhydride, maleic acid, maleic acid anhydride, fumaric acid, dimerized and trimerized unsaturated fatty acids, optionally in admixture with monomeric unsaturated fatty acids, such as oleic acid, terephthalic acid dimethyl ester and terephthalic acid-bis-glycol ester. Suitable polyhydric alcohols are, for example, ethylene glycol, 1,2- and 1,3-propylene glycol, 1,4- and 2,3-butylene glycol, 1,6-hexane diol, 1,8-octane diol, neopentylglycol, 1,4-bis-hydroxymethyl cyclohexane, 2-methyl-1,3-propane diol, glycerol, trimethylol propane, 1,2,6-hexane triol, 1,2,4-butane triol, trimethylol ethane, pentaerythritol, quinitol, mannitol, sorbitol, formitol and methyl glycoside, also diethylene glycol, triethylene glycol, tetraethylene glycol and higher polyethylene glycols, dipropylene glycol and higher polypropylene glycols, dibutylene glycol and higher polybutylene glycols. The polyesters may contain terminal carboxyl groups. Polyesters of lactones, for example, ε-caprolactone, or of hydroxy carboxylic acids, for example, ω-hydroxy caproic acid, may also be used. It is also possible to use castor oil as the coherent phase of the suspension. Suspensions in castor oil are particularly suitable for the production of polyurethane reactive adhesives and gap-filling compounds.

(b) The polyethers containing at least 2, generally from 2 to 8, and preferably 2 or 3 hydroxyl groups suitable for use are obtained, for example, by polymerizing epoxides, such as ethylene oxide, propylene oxide, butylene oxide, tetrahydrofuran, styrene oxide or epichlorohydrin on their own, for example, in the presence of Lewis catalysts, such as $BF_3$. They may also be obtained by the addition of these epoxides, preferably ethylene oxide and propylene oxide, with starter components containing reactive hydrogen atoms, such as water, alcohols, ammonia or amines. Examples are ethylene glycol, 1,3-propylene glycol or 1,2-propylene glycol, trimethylol propane, glycerol, sorbitol, 4,4'-dihydroxy diphenyl propane, aniline, ethanolamine or ethylene diamine. Sucrose polyethers of the type described, for example, in German Auslegeschriften Nos. 1,176,358 and 1,064,938 and formitol- or formose-started polyethers (German Offenlegungsschriften Nos. 2,639,083 and 2,737,951) may also be used. It is preferred to use polyethers which predominantly contain primary OH-groups (up to 90% by weight, based on all the OH-groups present in the polyether). Polybutadienes containing OH-groups are also suitable for use.

(c) Among the polythioethers reference is made in particular to the condensation products of thiodiglycol on its own and/or with other glycols, dicarboxylic acids, formaldehyde, aminocarboxylic acids or amino alcohols. Depending on the co-components, the products are, for example, polythio mixed ethers, polythioether esters or polythioether ester amides.

(d) Suitable polyacetals are, for example, the compounds obtainable from glycols, such as diethylene glycol, triethylene glycol, 4,4'-dioxethoxy diphenyl dimethyl methane, hexane diol and formaldehyde. Polyacetals suitable for use may also be obtained by polymerizing cyclic acetals, such as trioxane (German Offenlegungsschrift No. 1,694,128).

(e) Suitable polycarbonates containing hydroxyl groups are known per se and can be obtained, for example, by reacting diols, such as 1,3-propane diol, 1,4-butane diol and/or 1,6-hexane diol, diethylene glycol, triethylene glycol, tetraethylene glycol or thiodiglycol, with diaryl carbonates, for example diphenyl carbonate, or phosgene (German Auslegeschriften Nos. 1,694,080; 1,915,908 and 2,221,751; and German Offenlegungsschrift No. 2,605,024).

(f) Suitable examples of polyester amides and polyamides include the predominantly linear condensates obtained, for example, from polybasic saturated or unsaturated carboxylic acids or their anhydrides and polyhydric saturated or unsaturated amino alcohols, diamines, polyamines and mixtures thereof.

(g) Polyhydroxyl compounds already containing urethane or urea groups and optionally modified natural polyols, such as castor oil or carbohydrates, for example starch, may also be used. Addition products of alkylene oxides with phenol formaldehyde resins or even with urea formaldehyde resins may also be used.

(h) It is also possible to use polyhydroxyl compounds containing high molecular weight polyadducts and polycondensates or polymers in a finely dispersed or dissolved form. Such polyhydroxyl compounds are obtained, for example, by carrying out polyaddition reactions and polycondensation reactions in situ in the above-mentioned compounds containing hydroxyl groups. Processes such as these are described, for example, in German Auslegeschriften Nos. 1,168,075 and 1,260,142 and in German Offenlegungsschriften Nos. 2,324,134; 2,423,984; 2,512,385; 2,513,815; 2,550,796; 2,550,797; 2,550,833; 2,550,862; 2,633,293 and 2,639,254. It is also possible in accordance with U.S. Pat. No. 3,869,413 or German Offenlegungsschrift No. 2,550,860 to mix an aqueous polymer dispersion with a polyhydroxyl compound and subsequently to remove the water from the mixture.

Polyhydroxyl compounds modified by vinyl polymers of the type obtained, for example, by polymerizing styrene and acrylonitrile in the presence of polyethers (U.S. Pat. Nos. 3,383,351; 3,304,273; 3,523,093 and 3,110,695; and German Auslegeschrift No. 1,152,536) or polycarbonate polyols (German Pat. No. 1,769,795 and U.S. Pat. No. 3,637,909) are also suitable. Plastics having particularly good flameproof properties are obtained by using polyether polyols modified in accordance with German Offenlegungsschriften Nos. 2,442,101; 2,644,922 and 2,646,141 by graft polymerization with vinyl phosphonic acid esters. Optionally, (meth)acrylonitrile, (meth)acrylamide or OH-functional (meth)acrylic acid esters may also be used. Polyhydroxyl compounds into which carboxyl groups have been introduced by radical graft polymerization with unsaturated carboxylic acids and other olefinically unsaturated monomers (German Offenlegungsschriften Nos. 2,714,291; 2,739,620 and 2,654,746) may be particularly advantageously used in combination with mineral fillers.

Representatives of the above-mentioned compounds are described, for example, in High Polymers, Volume XVI, "Polyurethanes, Chemistry and Technology", by Saunders Frisch, Interscience Publishers, New York/-London, Volume I, 1962, pages 32 to 42 and pages 44 to 54 and Volume II, 1964, pages 5–6 and 198–199, and in Kunststoff-Handbuch, Volume VII, Vieweg-Hochtlen, Carl-Hanser-Verlag, Munich, 1966, for example, on pages 45 to 71. It is possible to use mixtures of the above-mentioned compounds containing at least two isocyanate-reactive hydrogen atoms and having a molecular weight of from 400 to 10,000. Examples are mixtures of polyethers and polyesters.

It is also possible to add to the suspensions quantities of up to 50% by weight and preferably less than 30% by weight (based on the entire polyol component) of low molecular weight polyhydric alcohols of the type described below as chain extenders in the production of polyurethane plastics. This is of particular interest where it is intended to produce extremely rigid polyurethane moldings or coatings.

As in cases where pure or prereacted polyols are used as dispersants (component B), the mixtures of the polyol components should be liquid or at least wax-like at temperatures below 50° C. It is only in rare cases that the liquefaction temperature may be higher, i.e. up to about 100° C.

The suspensions are particularly suitable for use as the polyol component in the production of optionally foamed plastics by the polyisocyanate-polyaddition process. It is possible to produce from them homogeneous and also cellular, flexible and rigid polyurethane moldings and coatings. Also lacquers, adhesives, gap-filling compounds and aqueous dispersions having improved properties can be produced. The use of the suspensions of finely dispersed TDI residue slag powders in relatively high molecular weight polyhydroxyl compounds results in an increase in the hardness of the polyurethane end products. It also results in a very considerable increase in their tensile strength, so that there is little or no need for the low molecular weight chain extending agents normally used.

Another advantage of these dispersions is the fact that they reduce the flammability of the products produced from them, for example, PUR foams. Polyester polyurethanes produced from these suspensions are more resistant to hydrolysis.

The present invention also relates to a process for producing optionally cellular polyurethane plastics, which may optionally contain ionic groups, by reacting:

(a) polyisocyanates with (b) filler-containing polyhydroxyl compounds having a molecular weight of from 400 to 10,000 and, optionally, (c) chain extenders having a molecular weight of from 34 to 200, optionally in the presence of (d) catalysts, blowing agents and other known additives, wherein the improvement comprises using the suspensions according to the present invention as component (b).

Polyisocyanates suitable for use as component (a) are aliphatic, cycloaliphatic, araliphatic, aromatic and heterocyclic polyisocyanates of the type described, for example, by W. Siefken in Justus Liebigs Annalen der Chemie, 562, pages 75 to 136. Examples are those corresponding to the following general formula:

$$Q(NCO)_n$$

wherein n represents 2–4, preferably 2, and

Q represents an aliphatic hydrocarbon radical containing from 2 to 18 carbon atoms, preferably from 6 to 10 carbon atoms, a cycloaliphatic hydrocarbon radical containing from 4 to 15 carbon atoms, preferably from 5 to 10 carbon atoms, an aromatic hydrocarbon radical containing from 6 to 15 carbon atoms, preferably from 6 to 13 carbon atoms, or an araliphatic hydrocarbon radical containing from 8 to 15 carbon atoms, preferably from 8 to 13 carbon atoms. Examples are ethylene diisocyanate, 1,4-tetramethylene diisocyanate, 1,6-hexamethylene diisocyanate, 1,12-dodecane diisocyanate, cyclobutane-1,3-diisocyanate, cyclohexane-1,3- and -1,4-diisocyanate and mixtures of these isomers, 1-isocyanato-3,3,5-trimethyl-5-isocyanato-methyl cyclohexane (German Auslegeschrift No. 1,202,785 and U.S. Pat. No. 3,401,190), 2,4- and 2,6-hexahydrotolylene diisocyanate and mixtures of these isomers, hexahydro-1,3- and/or -1,4-phenylene diisocyanate, perhydro-2,4'- and/or 4,4'-diphenylmethane diisocyanate, 1,3- and 1,4-phenylene diisocyanate, 2,4- and 2,6-tolylene diisocyanate and mixtures of these isomers, diphenylmethane-2,4'- and/or -4,4'-diisocyanate and naphthylene-1,5-diisocyanate.

It is also possible to use triphenylmethane-4,4',4"-triisocyanate. Also polyphenyl polymethylene polyisocyanates of the type obtained by condensing aniline with formaldehyde, followed by phosgenation, and described, for example, in British Pat. Nos. 874,430 and 848,671 may be used. More examples are m- and p-isocyanatophenyl sulphonyl isocyanates according to U.S. Pat. No. 3,454,606, perchlorinated aryl polyisocyanates of the type described, for example, in German Auslegeschrift No. 1,157,601 (U.S. Pat. No. 3,277,138), polyisocyanates containing carbodiimide groups of the type described in German Pat. No. 1,092,007 (U.S. Pat. No. 3,152,162) and in German Offenlegungsschriften Nos. 2,504,400; 2,537,685 and 2,552,530. Norbornane diisocyanates according to U.S. Pat. No. 3,492,330, polyisocyanates containing allophanate groups of the type described, for example, in British Pat. No. 994,890, in Belgian Patent No. 761,626 and in Dutch Patent Application No. 7,102,524 can also be used. Polyisocyanates containing isocyanurate groups of the type described, for example, in U.S. Pat. No. 3,001,973, in German Pat. Nos. 1,022,789; 1,222,067 and 1,027,394 and in German Offenlegungsschriften Nos. 1,929,034 and 2,004,048 as well as polyisocyanates containing urethane groups of the type described, for example, in Belgian Pat. No. 752,261 or in U.S. Pat. Nos. 3,394,164 and 2,644,457 and polyisocyanates containing acylated urea groups according to German Pat. No. 1,230,778 and polyisocyanates containing biuret groups of the type described, for example, in U.S. Pat. Nos. 3,124,605; 3,201,372 and 3,124,605 and in British Patent No. 889,050 are further examples. Polyisocyanates produced by telomerization reactions of the type described, for example, in U.S. Pat. No. 3,654,106, polyisocyanates containing ester groups of the type described, for example, in British Patent Nos. 965,474 and 1,072,956, in U.S. Pat. No. 3,567,763 and in German Pat. No. 1,231,688 can also be used. Reaction products of the above-mentioned diisocyanates with acetals according to German Pat. No. 1,072,385 and polyisocyanates containing polymeric fatty acid esters according to U.S. Pat. No. 3,455,883 are included.

It is also possible to use other isocyanate-group-containing distillation residues obtained in the commercial production of isocyanates. These may be in solution in one or more of the above-mentioned polyisocyanates. It is also possible to use any mixtures of the above-mentioned polyisocyanates.

In general, it is particularly preferred to use the commercially available polyisocyanates, for example, 2,4- and 2,6-tolylene diisocyanate and any mixtures of these isomers ("TDI"). Polyphenyl polymethylene polyisocyanates of the type obtained by condensing aniline with formaldehyde, followed by phosgenation ("crude MDI") and polyisocyanates containing carbodiimide groups, urethane groups, allophanate groups, isocyanurate groups, urea groups or biuret groups ("modified polyisocyanates") can be used. Particularly preferred are modified polyisocyanates of the type derived from 2,4- and/or 2,6-tolylene diisocyanate or from 4,4'- and/or 2,4'-diphenylmethane diisocyanate.

Other starting components which may optionally be used in the production of polyurethane plastics are compounds containing at least 2 isocyanate-reactive hydrogen atoms and having a molecular weight of from 32 to 400. Examples of these are compounds containing hydroxyl groups and/or amino groups and/or thiol groups and/or carboxyl groups. Preferably preferred are compounds containing hydroxyl groups and/or amino groups which serve as chain extenders or cross-linkers. These compounds generally contain from 2 to 8 and preferably from 2 to 4 isocyanate-reactive hydrogen atoms.

Here, too, it is possible to use mixtures of different compounds containing at least two isocyanate-reactive hydrogen atoms and having a molecular weight in the range of from 32 to 400.

Examples of such compounds are ethylene glycol, 1,2- and 1,3-propylene glycol, 1,4- and 2,3-butylene glycol, 1,5-pentane diol, 1,6-hexane diol, 1,8-octane diol, neopentylglycol, 1,4-bis-hydroxymethyl cyclohexane, 2-methyl-1,3-propane diol, dibromobutene diol (U.S. Pat. No. 3,723,392), glycerol, trimethylol propane, 1,2,6-hexane triol, trimethylol ethane, pentaerythritol, quinitol, mannitol, sorbitol, castor oil, diethylene glycol, triethylene glycol, tetraethylene glycol, higher polyethylene glycols having a molecular weight of up to 400, dipropylene glycol, higher polypropylene glycols having a molecular weight of up to 400, dibutyl glycol, higher polybutylene glycol having a molecular weight of up to 400, dibutylene glycol higher polybutylene glycols having a molecular weight of up to 400, 4,4'-dihydroxy diphenyl propane, dihydroxy methyl hydroquinone, ethanolamine, diethanolamine, N-methyl diethanolamine, triethanolamine and 3-aminopropanol.

Other suitable low molecular weight polyols are the mixtures of hydroxy aldehydes and hydroxy ketones ("formose"). Also the polyhydric alcohols obtained by "formose" reduction ("formitol"). These are formed in the autocondensation of formaldehyde hydrate in the presence of metal compounds as catalysts and compounds capable of enediol formation as co-catalysts (German Offenlegungschriften Nos. 2,639,084; 2,714,084; 2,714,104; 2,721,186; 2,738,154 and 1,738,512). In order to obtain plastics having improved fire resistance, these formoses are advantageously used in combination with aminoplast formers and/or phosphites (German Offenlegungsschriften Nos. 2,738,513 and 2,738,532). Solutions of polyisocyanate polyaddition products, particularly solutions of polyurethane ureas containing ionic groups and/or solutions of polyhydrazodicarbonamides, in low molecular weight polyhydric alcohols may also be used as the polyol component (German Offenlegungsschrift No. 2,638,759). Solutions of polyisocyanate polyaddition products, particularly solutions of polyurethane ureas containing ionic groups and/or solutions of polyhydrazodicarbonamides, in low molecular weight polyhydric alcohols may be used as the polyol component (German Offenlegungsschrift No. 2,638,759).

Aliphatic diamines suitable for use in accordance with the present invention are, for example, ethylene diamine, 1,4-tetramethylene diamine, 1,11-undecamethylene diamine, 1,12-dodecamethylene diamine and mixtures thereof, 1-amino-3,3,5-trimethyl-5-aminomethyl cyclohexane ("isophorone diamine"), 2,4- and 2,6-hexahydrotolylene diamine and mixtures thereof, perhydro-2,4'- and -4,4'-diaminodiphenyl methane, p-xylylene diamine, bis-(3-aminopropyl)-methylamine, diaminoperhydro anthracenes (German Offenlegungsschrift No. 2,638,731) and cycloaliphatic triamines according to German Offenlegungsschrift No. 2,614,244. It is also possible to use hydrazine and substituted hydrazines, for example, methyl hydrazine, N,N'-dimethyl hydrazine and their homologs. Also acid dihydrazides, for example, carbodihydrazide, oxalic acid dihydrazide, the dihydrazides of malonic acid, succinic acid, glutaric acid, adipic acid, β-methyl adipic acid, sebacic acid, hydracrylic acid and terephthalic acid; semicarbazido alkylene hydrazides such as β-semicarbazido propionic acid hydrazide (German Offenlegungsschrift No. 1,770,591), semicarbazido alkylene carbazinic esters such as 2-semicarbazido ethyl carbazinic ester (German Offenlegungsschrift No. 1,918,504) may be used. Even aminosemicarbazide compounds such as β-aminoethyl semicarbazido carbonate (German Offenlegungsschrift No. 1,902,931) are useable. To control their reactivity, the amino groups may be completely or partly blocked by aldimine or ketimine groups (U.S. Pat. No. 3,734,894 and German Offenlegungsschrift No. 2,637,115).

Examples of aromatic diamines are bis-anthranilic acid esters (German Offenlegungsschriften Nos. 2,040,644 and 2,160,590), 3,5- and 2,4-diaminobenzoic acid esters (German Offenlegungsschrift No. 2,025,900), the diamines containing ester groups (German Offenlegungsschrift Nos. 1,803,635 [U.S. Pat. Nos. 3,681,290 and 3,736,350], 2,040,650 and 2,160,589), the diamines containing ether groups (German Offenlegungsschriften Nos. 1,770,525 and 1,809,172 [U.S. Pat. Nos. 3,654,364 and 3,736,295]), 2-halogen-1,3-phenylene diamines optionally substituted in the 5-position (German Offenlegungsschriften Nos. 2,011,722; 2,025,896 and 2,065,869), 3,3'-dichloro-4,4'-diaminodiphenyl methane, tolylene diamine, 4,4'-diaminodiphenyl methane, 4,4'-diaminodiphenyl disulphides (German Offenlegungsschrift No. 2,404,976), diaminodiphenyl dithio ethers (German Offenlegungsschrift No. 2,509,404), aromatic diamines substituted by alkyl thio groups (German Offenlegungsschrift No. 2,638,760), diaminobenzene phosphonic acid esters (German Offenlegungsschrift No. 2,459,491), aromatic diamines containing sulphonate or carboxylate groups (German Offenlegungsschrift No. 2,720,166) and the high-melting diamines (German Offenlegungsschrift No. 2,635,400). Examples of aliphaticaromatic diamines are the aminoalkyl thioanilines according to German Offenlegungsschrift No. 2,734,574.

Other suitable chain extenders are compounds such as 1-mercapto-3-aminopropane, optionally substituted amino acids, for example, glycine, alanine, valine, serine and lysine, and optionally substituted dicarboxylic acids, for example succinic acid, adipic acid, phthalic acid, 4-hydroxy phthalic acid and 4-aminophthalic acid.

In addition, isocyanate-monofunctional compounds may be used as so-called chain terminators in proportions of from 0.01 to 10% by weight, based on polyurethane solids. These monofunctional compounds are, for example, monoamines, such as butyl- and dibutylamine, octylamine, stearylamine, N-methyl stearylamine, pyrrolidine, piperidine and cyclohexylamines, monoalcohols such as butanol, 2-ethyl hexanol, octanol, dodecanol, the various amyl alcohols, cyclohexanol and ethylene glycol monoethyl ether.

Other polyols having a molecular weight of up to 400 which may be used as chain extenders are ester diols corresponding to the following general formulas:

$$HO\text{—}(CH_2)_x\text{—}CO\text{—}O\text{—}(CH_2)_y\text{—}OH \text{ and}$$

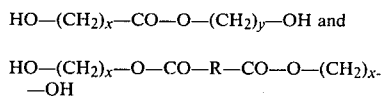

wherein

R represents an alkylene radical containing from 1 to 10, preferably from 2 to 6 carbon atoms or a cycloalkylene or arylene radical containing from 6 to 10 carbon atoms, x represents from 2 to 6 and y represents from 3 to 5.

Examples are δ-hydroxybutyl-ε-hydroxy caproic acid ester, ω-hydroxyhexyl-γ-hydroxybutyric acid ester, adipic acid-bis-(β-hydroxyethyl)-ester and terephthalic acid-bis-(β-hydroxyethyl)-ester.

Also included are diol urethanes corresponding to the following general formula:

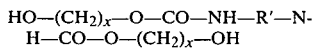

wherein

R' represents an alkylene radical containing from 2 to 15, preferably from 2 to 6 carbon atoms or a cycloalkylene or arylene radical containing from 6 to 15 carbon atoms and x represents a number of from 2 to 6. Examples are 1,6-hexamethylene-bis-(β-hydroxyethyl urethane) or 4,4'-diphenylmethane-bis-(δ-hydroxybutyl urethane). Further examples are the diol ureas corresponding to the following general formula:

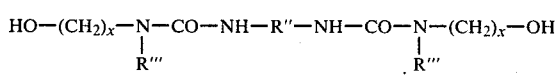

wherein

R" represents an alkylene radical containing from 2 to 15, preferably from 2 to 9 carbon atoms or a cycloalkylene or arylene radical containing from 6 to 15 carbon atoms, R''' represents hydrogen or a methyl group and x represents the number 2 or 3, for example, 4,4'-diphenylmethane-bis-(β-hydroxyethyl urea) or the compound:

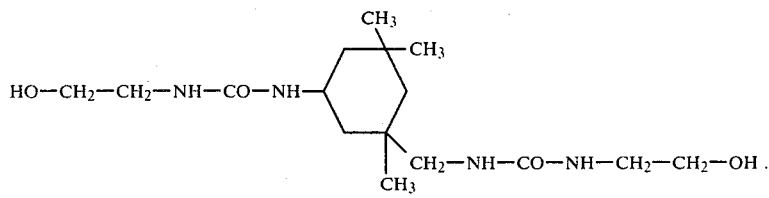

In some cases, it is advantageous to use polyols containing sulphonate and/or phosphonate groups (German Offenlegungsschrift No. 2,719,372), preferably the adduct of bisulphite with 1,4-butene diol or its alkoxylation products.

The following are auxiliaries and additives which may be used in the production of polyurethane plastics:

(a) Water and/or readily volatile inorganic or organic substances as blowing agents. Organic blowing agents are, for example, acetone, ethylacetate, halogen-substituted alkanes, such as methylene chloride, chloroform, ethylidene chloride, vinylidene chloride, monofluorotrichloromethane, chlorodifluoromethane, dichlorodifluoromethane and also butane, hexane, heptane, or diethyl ether. Inorganic blowing agents are, for example, air, $CO_2$ or $N_2O$. A blowing effect may also be obtained by adding compounds which decompose at temperatures above room temperature giving off gasses, such as nitrogen. Examples are azo compounds such as azodicarbonamide or azoisobutyronitrile. Other examples of blowing agents and information on the use of blowing agents can be found in Kunststoff-Handbuch, Volume VII, by Vieweg and Hochtlen, Carl-Hanser-Verlag, Munich, 1966, for example, on pages 108 and 109, 453 to 455 and 507 to 510.

(b) Catalysts known per se can be used. Examples are tertiary amines, such as triethylamine, tributylamine, N-methyl morpholine, N-ethyl morpholine, N,N,N',N'-tetramethyl ethylene diamine, pentamethyl diethylene triamine and higher homologs (German Offenlegungsschriften Nos. 2,624,527 and 2,624,528). Also 1,4-diazabicyclo-(2,2,2)-octane, N-methyl-N'-dimethylaminoethyl piperidine, bis(dimethylaminoalkyl)-piperazines (German Offenlegungsschrift No. 2,636,787), N,N-dimethylbenzylamine, N,N-dimethyl cyclohexylamine, N,N-diethyl benzylamine, bis(N,N-diethylaminoethyl)-adipate, N,N,N',N'-tetramethyl-1,3-butane diamine, N,N-dimethyl-$\beta$-phenyl ethylamine, 1,2-dimethylimidazole, 2-methylimidazole, monocyclic and bicyclic amidines (German Offenlegungsschrift No. 1,720,633) may be used. Additionally, bis-(dialkylamino)-alkyl ethers (U.S. Pat. No. 3,330,782, German Auslegeschrifte No. 1,030,558, and German Offenlegungsschriften Nos. 1,804,361 and 2,618,280) and tertiary amines containing amide groups, preferably formamide groups (German Offenlegungsschriften Nos. 2,523,633 and 2,732,292) can also be used. Suitable catalysts also include known Mannich bases of secondary amines. These include dimethylamine and aldehydes, preferably formaldehyde or ketones, such as acetone, methylethyl ketone or cyclohexanone, and phenols, such as phenol, nonyl phenol or bisphenol.

Tertiary amines containing isocyanate-reactive hydrogen atoms are suitable for use as catalysts. Examples are triethanolamine, triisopropanolamine, N-methyl-diethanolamine, N-ethyl-diethanolamine and N,N-dimethyl-ethanolamine. Also their reaction products with alkylene oxides, such as propylene oxide and/or ethylene oxide and secondary tertiary amines according to German Offenlegungsschrift No. 2,732,292 may be used.

Other suitable catalysts are sila-amines containing carbon-silicon bonds of the type described, for example, in German Pat. No. 1,229,290 (corresponding to U.S. Pat. No. 3,620,984). Examples are 2,2,4-trimethyl-2-silamorpholine and 1,3-diethyl-aminomethyl tetramethyl disiloxane.

Other suitable catalysts are nitrogen-containing bases, such as tetraalkyl ammonium hydroxides. Also included are alkali metal hydroxides such as sodium hydroxide and alkali metal phenolates, such as sodium phenolate, or alkali metal alcoholates, such as sodium methylate. Hexahydrotriazines may also be used as catalysts (German Offenlegungsschrift No. 1,769,043).

The reaction between NCO-groups and Zerewitinoff-active hydrogen atoms is also greatly accelerated by lactams and azalactams. Initially an association is formed between the lactam and the compound containing acid hydrogen. Associates such as these and their catalytic effect are described in German Offenlegungsschrift Nos. 2,062,288; 2,062,289; 2,177,576 (U.S. Pat. No. 3,758,444); 2,129,198; 2,330,175 and 2,330,211.

It is also possible to use organometallic compounds, particularly organo tin compounds, as catalyst. In addition to sulphur-containing compounds, such as di-n-octyl tin mercaptide (German Auslegeschrift No. 1,769,367 and U.S. Pat. No. 3,654,927), preferred organo tin compounds are tin(II)salts of carboxylic acids, such as tin(II)acetate, tin(II)octoate, tin(II) ethyl hexoate and tin(II)laurate and tin(IV) compounds, for example, dibutyl tin oxide, dibutyl tin dichloride, dibutyl tin diacetate, dibutyl tin dilaurate, dibutyl tin maleate or dioctyl tin diacetate.

All the above-mentioned catalysts may be used in the form of mixtures. Combinations of organometallic compounds and amidines, aminopyridines or hydrazino pyridines (German Offenlegungsschriften Nos. 2,434,185; 2,601,082 and 2,603,834) are of particular interest.

Further representative of catalysts suitable for use and information of the way in which they work can be found in Kunststoff-Handbuch by Vieweg and Hochtlen, Volume VII, Carl-Hanser-Verlag, Munich 1966, for example on pages 96 to 102.

The catalysts are generally used in a quantity of from about 0.001 to 10% by weight, based on the total quantity of compounds containing at least two isocyanate-reactive hydrogen atoms.

(c) Surface active additives, such as emulsifiers and foam stabilizers. Suitable emulsifiers are, for example, the sodium salts of castor oil sulphonates or salts of fatty acids with amines, such as diethylamine oleate or diethanolamine stearate. Alkali metal or ammonium salts of sulphonic acids, such as dodecyl benzene sulphonic acid or dinaphthyl methane disulphonic acid, or of fatty acids, such as ricinoleic acid, or of polymeric fatty acids may also be used as surface-active additives.

Suitable foam stabilizers are, above all, polyether siloxanes, particularly water soluble types. The structure of these compounds is generally such that a copolymer of ethylene oxide and propylene oxide is attached to a polydimethyl siloxane residue. Foam stabilizers such as these are described, for example, in U.S. Pat. Nos. 3,834,748; 2,917,480 and 3,629,308. Polysiloxane-polyoxyalkylene copolymers branched through allophanate groups according to German Offenlegungsschrift No. 2,558,523 are of particular interest.

(d) Reaction retarders, for example acid-reacting substances such as hydrochloric acid or organic acid halides. Included are cell regulators known per se, such as paraffins or fatty alcohols or dimethyl polysiloxanes. Also known are pigments or dyes and flameproofing agents known per se, for example trischloroethyl phosphate, tricresyl phosphate or ammonium phosphate and polyphosphate. Stabilizers against the effects of ageing and weather, plasticizers and fungistatic and bacteriostatic substances may be used. Also used are fillers such as barium sulphate, kieselguhr, carbon black or whiting.

Further examples of surface-active additives and foam stabilizers, cell regulators, reaction retarders, stabilizers, flameproofing agents, plasticizers, dyes, fillers, fungistatic and bacteriostatic substances which may be used and information on the way in which these additives are used and on their respective modes of action can be found in Kunststoff-Handbuch by Vieweg and Hochtlen, Volume VII, Carl-Hanser-Verlag, Munich 1966, for example on pages 103 to 113.

The process according to the present invention is carried out as follows:

The reaction components are reacted by the known one-shot process, by the prepolymer process or by the semi-prepolymer process. Suitable machines are, for example, of the type described in the U.S. Pat. No. 2,764,565. Particulars of processing machines which may also be used in accordance with the present invention can be found in Kunststoff-Handbuch by Vieweg and Hochtlen, Volume VII, Carl-Hanser-Verlag, Munich 1966, for example on pages 121 to 205.

In the production of foams, it is also possible to carry out foaming in closed molds. The reaction mixture is introduced into a mold. Suitable mold materials are metals, for example aluminum, or plastics, for example epoxide resin. The foamable reaction mixture foams in the mold and forms the molding. Foaming inside the mold may be carried out in such a way that the molding has a cellular structure at its surface. It may also be carried out in such a way that the molding has a compact skin and a cellular core. It is possible to introduce foamable reaction into the mold in such a quantity that the foam formed just fills the mold. It is also possible to introduce into the mold more foamable reaction mixture than is required for filling the interior of the mold with foam. This particular technique is known as overcharging (U.S. Pat. Nos. 3,178,490 and 3,182,104).

Known "external release agents", such as silicone oils, can be used for foaming inside the mold. It is also possible to use so-called "internal release agents". These may be used in admixture with known external release agents (German Offenlegungsschriften Nos. 2,121,670 and 2,307,589).

It is also possible to produce cold-hardening foams (cf. British Pat. No. 1,162,517 and German Offenlegungsschrift No. 2,153,086).

It is also possible to produce foams by block foaming or by the laminator process known per se.

The present invention is illustrated but in no way limited by the following Examples in which the quantities quoted represent parts by weight or percent by weight, unless otherwise indicated.

TABLE 1

Production of the TDI residue slag powders used in the Examples from distillation residues insoluble in inert solvents of the type accumulating in the production of monomeric tolylene diisocyanate. Residues I and II emanate from the production of T80 and residue III from the production of T65.

| TDI Residue Slag Powder | NCO-content (%) | Size-reducing machines | Decomposition (°C.) | Particle size (mμ) |
|---|---|---|---|---|
| 1 | 2 | 3 | 4 | 5 |
| I | 7.2 | HM + AJM | 270 | 4 |
| II | 8.4 | HM + AJM | 275 | 20 |
| III | 10.9 | HM + AJM | 270 | 25 |

Key to Table 1:
Column 3: Type of rough and fine grinding machine used for dry size-reduction
HM = hammer mill
AJM = air jet mill
Column 4: Beginning of decomposition in °C.
Column 5: Particle size in mμ of approximately 50% by weight of the ground material.

A phosgenation residue remaining in the sump in the production of tolylene diisocyanates is run off in a highly viscous form (temperature approximately 150° to 180° C.) into a stirrer-equipped vessel containing at least twice the quantity of water. A large number of the free isocyanate groups react to form polyureas. The reaction is accompanied by the evolution of carbon dioxide. This quenching and denaturing process is accompanied by intense heating of the water. This results in the formation of a coarsely divided, very irregularly shaped, porous residue slag. The water is run off into a trough until the water content still present in the slag has fallen to below 10% by weight and, more advantageously for subsequent size-reduction in a hammer mill, to below 5% by weight.

In order to determine the included isocyanate content, a sample has to be size-reduced to at least less than 60 mμ and heated to 50° C. in acetone. By way of comparison, only about half the free NCO-groups are observed at room temperature. In the case of coarse-grained TDI residue slag, it is only possible to determine a fraction thereof. Depending on the grain size, the NCO-content of the denatured residue slag wetted with water gradually decreases over a period of days (<500 mμ) to weeks (>2 to 3 mm) at room temperature. The reduction in the content of free isocyanate groups is prevented by drying the preground, quenched and denatured TDI residue slag. The TDI residue is preground to a grain size of less than 3 mm, for example in a hammer mill. It is dried at temperatures below 50° C. in a recirculating air cabinet until the water content has preferably fallen to below 0.2% by weight. This is followed by storage in the absence of air. Fine grinding may be carried out in an air stream mill. Very fine grain sizes are obtained in a single operation by means of air jet mills.

EXAMPLES

EXAMPLE 1

TDI Residue Dispersion in a Branched Polyether 150 parts by weight of a trimethylol-propane-started polyether of propylene oxide and ethylene oxide (OH-number 34) containing approximately 80% of primary OH-groups and having a viscosity of 1,300 mPas/25° C. (polyether 1) are introduced into a stirrer-equipped vessel. 100 parts by weight of TDI residue I are stirred in and the suspension is heated. At 80° C., another 50 parts by weight of TDI residue I are added. The temperature is initially increased with stirring under nitrogen to 100° C. After about 2 hours, when the NCO-content has fallen to below 1% by weight, heating is continued for another 2 to 3 hours to 150° C. When the NCO-content amounts to less than 0.1% by weight, the dispersion is cooled. The stable 40% dispersion has a viscosity of 16,500 mPas at 25° C. After dilution to 20% with polyether 1, a viscosity of 2,300 mPas is obtained.

Flexible PUR foams produced in the conventional way using this dispersion have improved compression hardness and fire-resistance. Improvement increases with increasing content of very finely divided TDI residue.

EXAMPLE 2

TDI Residue Prepolymer Dispersion

A 40% TDI dispersion is prepared with the same components and quantities as described in Example 1. The temperature is not allowed to exceed 80° C. After about 2 hours, the free isocyanate content amounts to 2.9% by weight. The viscosity of the dispersion is reduced by half in comparison with Example 2: 40% at 25° C., 8850 mPas.

After storage for 3 months at 20° to 30° C., the isocyanate content is exactly the same.

EXAMPLES 3 TO 5

TDI Residue Dispersions in a Branched Polyether

Methods for Examples (in parts by weight):

| 3 | 4 | 5 | |
|---|---|---|---|
| 228.5 | 363.6 | 650.0 | of a trimethylol-propane-started polyether (polyether 2) of propylene oxide and ethylene oxide (OH-number 49; approximately 5% of primary OH-groups; viscosity 550 mPas) |
| 100.0 | 100.0 | 100.0 | TDI residue II |
| 30.4 | 21.6 | 13.3 | solids content (% by weight) |
| 300 | 50 | 40 | reaction time (minutes). |

The polyether introduced into a stirrer-equipped vessel is heated to 140° C. The indicated quantity of TDI residue powder is then added. This is followed by stirring at from 135° to 140° C. until the isocyanate content has fallen to at least 0.2% by weight.

The stable dispersions have viscosities of 2300, 1400 and 890 mPas at 25° C.

EXAMPLES 6 AND 7

TDI Residue Dispersions in a Linear Polyether

EXAMPLE 6

150.0 parts by weight of polypropylene glycol ether (polyether 3)
OH-number: 56; viscosity at 25° C.: 340 mPas
100.0 parts by weight of TDI residue I
0.5 part by weight of a 20% aqueous potassium hydroxide solution
are heated under nitrogen to 130°–140° C. in a stirrer-equipped vessel. The small quantity of water is run off under reduced pressure. Over a period of about 4 to 5 hours, the free isocyanate content falls to less than 0.4% by weight. The pH value of the dispersion is adjusted to pH 7 using polyphosphoric acid. The stable 40% dispersion has a viscosity of 1690 mPas at 25° C.

EXAMPLE 7

The procedure is as described in Example 6 with the exception that the potassium hydroxide solution is used in four times greater quantity. Under the conditions applied in Example 6, the residual isocyanate content falls to less than 0.1% by weight. The viscosity of the stable 40% dispersion increases to 2735 mPas.

EXAMPLE 8

Isocyanate prepolymer dispersion of an insoluble TDI residue, monomeric TDI and a linear polyether:
Recipe:
 206 parts by weight of polyether 3
 100 parts by weight of TDI residue I
 37 parts by weight of tolylene diisocyanate (monomer ratio 2,4-TDI:2,6-TDI=80:20).

The polyether is introduced into a stirrer-equipped vessel and heated under nitrogen to 100° C. The TDI residue is then stirred in. This is followed by the addition of the TDI monomer mixture. The temperature is gradually increased to 135° C. After about 60 to 80 minutes, the free isocyanate content still amounts to 2.7% by weight. It remains constant even after storage of the prepolymer dispersion for several months in the absence of moisture.

COMPARISON EXAMPLE

In contrast, a mixture of the TDI residue and monomer components indicated in Example 8 (without the polyether) is unstable in regard to its isocyanate content. Its isocyanate content continuously decreases (even with other mixing ratios) at elevated temperatures. It decreases even at approximately 20° C.

EXAMPLES 9 to 14

TDI residue addition reactions with low molecular weight H-acid components in a relatively high molecular weight polyether polyol.

EXAMPLE 9

Recipe:
 154.0 parts by weight of polyether 1
 100.0 parts by weight of TDI residue I
 4.2 parts by weight of hydrazine monohydrate.

The polyether is introduced into a stirrer-equipped vessel and heated under nitrogen to 80° C. Simultaneously, the TDI residue is added in portions with stirring. Immediately afterwards, the hydrazine monohydrate is gradually added and the temperature increased to 100° C. The water of hydration is distilled off under reduced pressure. The internal temperature increased to 135° C. After only 30 to 60 minutes, the free isocyanate group content has fallen to zero (for comparison, see Example 1).

The cooled, finely divided, 40% non-sedimenting dispersion has a viscosity of 9650 mPas at 25° C. After dilution with polyether 1 to 20%, the viscosity amounts to 1850 mPas at 25° C.

COMPARISON EXAMPLE

The procedure is as described in Example 9, except that the TDI residue containing free isocyanate groups is replaced by the equivalent quantity of isocyanate in the form of monomeric TDI. Soon after the hydrazine has been added, the reaction mixture gels and can no longer be stirred.

EXAMPLE 10

TDI residue-urea dispersion in a relatively high molecular weight linear polyester.

Recipe:

237 parts by weight of a mixed polyester (polyester 1) of 1,6-hexane diol, 2,2-dimethyl-1,3-propane diol in a molar ratio of 22:12 and adipic acid (OH-number 62; acid number 1)

100 parts by weight of TDI residue I 6 parts by weight of a 25% aqueous ammonia solution.

The very finely divided TDI residue is dispersed in the polyester and heated to 80° C. The ammonia solution is then added. The internal temperature is then gradually increased to 130° C. The water is distilled off under reduced pressure. The ammonia is quantitatively added over a period of one hour. In addition, some of the hydroxyl groups of the polyester also react. And therefore, no more free isocyanate can be detected.

This stable dispersion which is readily stirrable at 80° C. has a solids content of 30% by weight. It is suitable inter alia for the production of an aqueous PUR dispersion (Example 10A) for coating leather or textiles.

EXAMPLE 10A

Aqueous anionic PUR dispersion of a TDI residue dispersion:

Recipe:

338.5 parts by weight of the dispersion of Example 10

52.2 parts by weight of 2,4- and 2,6-tolylene diisocyanate (monomer ratio: 65:35)

52.0 parts by weight of a 45% aqueous solution of a diamine sulphonate corresponding to the formula: $H_2N-CH_2-CH_2-NH-CH_2-SO_3^{\ominus}Na^{\oplus}$ 912.0 parts by weight of acetone 557.4 parts by weight of water.

The TDI monomer mixture is added to the anhydrous dispersion of Example 10 and heated to 90° C. in a stirrer-equipped vessel surmounted by a fractionating column. This is followed by stirring for about 30 minutes until the NCO-content amounts to 3.3% by weight. Acetone and the diamine sulphonate solution are then successively added. After another 15 minutes, the water is added. The solvent is quantitatively distilled off. An aqueous PUR dispersion is obtained and may be applied to any substrates. If, for example, the dispersion is doctored onto a glass plate and the water completely evaporated at from 90° to 110° C., a homogeneous, flexible PUR elastomer film having a tensile strength of 17 mPas for an elongation at break of 380% is obtained.

EXAMPLES 11 to 14

Modified TDI residue dispersions in a low molecular weight branched polyester and their use as solvent-free adhesives and gap filling compounds.

EXAMPLE 11

Recipe:

150 parts by weight of castor oil (OH-number 165), viscosity at 25° C. = 670 mPas 100 parts by weight of TDI residue I 6 parts by weight of a 25% aqueous ammonia solution are reacted in the same way as described in Example 10.

The non-sedimenting, NCO-free 40% dispersion has a viscosity of 8920 mPas.

EXAMPLE 12

A finely divided TDI residue modified by polymethylene urea groups and dispersed in castor oil is prepared as follows:

150 parts by weight of TDI residue I of which the free NCO-groups have been converted into urea groups by reaction in bulk with a substantially equivalent quantity of ammonia are suspended in a stirrer-equipped vessel in 618 parts by weight of castor oil, followed by the addition of 15 parts by weight of a 30% formalin solution.

The pH of the suspension is adjusted using sulphuric acid to a value of 2. It is heated first to 80° C. and, after 60 minutes, to 100° C. The water is distilled off. After another 150 minutes, the suspension is neutralized using dry sodium phosphate solution. The 20% anhydrous dispersion has a viscosity of 4670 mPas at 25° C.

EXAMPLE 12A

Solvent-free Adhesive Formulations 100 parts by weight of the 20% TDI residue dispersion of Example 12 are thoroughly mixed at room temperature with 42.6 and 51.1 parts by weight of polyphenyl polymethylene polyisocyanate having an NCO-content of 30% by weight ("crude MDI"). Within 40 minutes, the resulting mixture is applied as a solvent-free adhesive to non-pretreated beechwood test specimens. These are then pressed together for 24 hours at 30 bars pressure.

In comparison with a bond obtained solely with castor oil and "crude MDI", the adhesive properties of the flexible bond of these compounds respectively show a two-fold and three-fold improvement in regard to shear strength and an eighty-fold and 110-fold improvement in thermal stability under load at 50° C.

EXAMPLE 13

Recipe:

161 parts by weight of castor oil 100 parts by weight of TDI residue II 5 parts by weight of ethanolamine 3 parts by weight of hydrazine monohydrate.

A mixture of the NH-compounds is slowly stirred at from 70° to 80° C. into a suspension of TDI residue II in castor oil. The free NCO-groups have completely reacted off after 1 hour.

The 40% finely divided dispersion has a viscosity of 15910 mPas at 25° C. After dilution with castor oil to 20%, the viscosity falls to 1570 mPas.

EXAMPLE 13A

Adhesive formulation

In comparison with a TDI residue-free comparison sample, a bond produced in accordance with Example 12A using an intensively stirred mixture of 100 parts by weight of the 40% dispersion of Example 12 and 32 parts by weight of "crude MDI" shows a 3.5 fold increase in shear strength and improved dimensional stability under load.

EXAMPLE 14

Recipe:

150 parts by weight of castor oil 100 parts by weight of TDI residue III
2 parts by weight of hydrazine monohydrate
50 parts by weight of toluene.

The TDI residue III from the production of 2,4-/2/6-tolylene diisocyanate (monomer ratio 65:35) on an industrial scale is suspended in a mixture of castor oil and toluene. It is reacted with the hydrazine at 90° C. to form polyhydrazo dicarbonamide groups. When the free isocyanate groups have been consumed (after about 50 to 70 minutes), the toluene is completely distilled off under reduced pressure.

The 40% dispersion has a viscosity of 7950 mPas at 25° C. and is suitable for use as a gap-filling compound. After dilution with castor oil to a solids content of 20%, the dispersion has a viscosity of 1230 mPas.

Although the invention has been described in detail for the purpose of illustration, it is to be understood that such detail is solely for that purpose and that variations can be made therein by those skilled in the art without departing from the spirit and scope of the invention except as it may be limited by the claims.

What is claimed is:

1. Dispersions comprising
(A) from 2% to 60% by weight, based on the total weight of the dispersion, of a crosslinked distillation residue which is insoluble in inert organic solvents and which cannot be melted without decomposing, and which contain less than 15% by weight of free isocyanate groups, of the type accumulating in the form of slag in the removal of monomeric tolylene diisocyanates by distillation which are ground to an average particle size of less than 350 m/$\mu$ as the disperse phase in
(B) compounds containing at least two aliphatic hydroxyl groups and having an average molecular weight of from 400 to 10,000 as the coherent phase.

2. A dispersion as claimed in claim 1, wherein component (A) has first been quenched and denatured in water.

3. A dispersion as claimed in claim 1, wherein the free isocyanate groups of component (A) have first been reacted completely or partially with compounds containing acid hydrogen atoms.

4. A dispersion as claimed in claim 1, wherein component (A) is present in from 5% to 50% by weight, based on the dispersion as a whole.

5. A dispersion as claimed in claim 1, wherein component (A) is ground to an average particle size of less than 25 m$\mu$.

6. A dispersion as claimed in claim 1, wherein component (A) is ground to an average particle size of less than 5 m$\mu$.

7. A dispersion as claimed in claim 1, wherein component (A) has been modified by reaction with carbonyl compounds.

8. A dispersion as claimed in claim 1, wherein component (A) has been modified by reaction with an olefinically unsaturated compound.

9. A dispersion as claimed in claim 1, wherein component (B) is a compound containing from 2 to 6 aliphatic hydroxyl groups and having an average molecular weight of from 600 to 3000.

* * * * *